(12) United States Patent
Gottwald-Grill et al.

(10) Patent No.: US 6,662,954 B2
(45) Date of Patent: Dec. 16, 2003

(54) CYLINDRICAL FILTER CARTRIDGE WITH SUPPORT TUBE

(75) Inventors: Renate Gottwald-Grill, Bietigheim-Bissingen (DE); Helmut Luka, Marbach (DE)

(73) Assignee: Filterwerk Mann & Hummel GmbH, Ludwigsburg (DE)

( * ) Notice: Subject to any disclaimer, the term of this patent is extended or adjusted under 35 U.S.C. 154(b) by 0 days.

(21) Appl. No.: 09/882,354

(22) Filed: Jun. 18, 2001

(65) Prior Publication Data
US 2002/0020662 A1 Feb. 21, 2002

(30) Foreign Application Priority Data
Jun. 17, 2000 (DE) .......................... 100 30 037

(51) Int. Cl.⁷ ............................... B01D 27/06
(52) U.S. Cl. ................ 210/437; 210/440; 210/444 L; 210/450; 210/455; 210/457; 210/493.2; 210/493.5; 210/497.01
(58) Field of Search ............. 210/493.1–493.2, 210/450, 457, DIG. 13, DIG. 17, 437, 443–444, 497.01, 440, 455

(56) References Cited

U.S. PATENT DOCUMENTS

| | | | |
|---|---|---|---|
| RE30,779 E | * 10/1981 | Cooper | 210/232 |
| 4,906,365 A | * 3/1990 | Baumann et al. | 210/238 |
| 4,911,840 A | * 3/1990 | Underwood | 210/266 |
| 5,015,375 A | 5/1991 | Fleck | |
| 5,118,417 A | * 6/1992 | Deibel | 210/232 |
| 5,413,712 A | * 5/1995 | Gewiss et al. | 210/450 |
| 5,547,480 A | 8/1996 | Coulonvaux et al. | |
| 5,589,060 A | * 12/1996 | Gebert et al. | 210/130 |
| 5,593,578 A | * 1/1997 | Bryan et al. | 210/232 |
| 5,868,932 A | * 2/1999 | Guichaoua et al. | 210/440 |
| 6,110,365 A | * 8/2000 | Bartels et al. | 210/232 |
| 6,391,193 B1 | * 5/2002 | Luka | 210/130 |

FOREIGN PATENT DOCUMENTS

| | | |
|---|---|---|
| DE | 9419087 | 3/1995 |
| DE | 19631278 | 2/1998 |
| DE | 19829989 | 1/2000 |
| WO | 8901818 | 3/1989 |
| WO | 89/01818 | 3/1989 |
| WO | WO 97/49476 | * 12/1997 |
| WO | WO 98/05403 | 2/1998 |
| WO | 99/05403 | 2/1999 |
| WO | WO 99/12629 | * 3/1999 |
| WO | 01/12629 | 2/2001 |

OTHER PUBLICATIONS

Hawley's Condensed Chemical Dictionary (Lewis, Richard J. Sr., 13th edition, pp. 792 and 906–907).*
German Office Action dated May 9, 2003.

* cited by examiner

Primary Examiner—W. L. Walker
Assistant Examiner—Marianne Ocampo
(74) Attorney, Agent, or Firm—Crowell & Moring LLP

(57) ABSTRACT

A filter cartridge comprising an annularly closed filter medium provided with end disks (16). Within the interior of the cartridge there is a support tube (24), which is made in one piece and has a radial sealing ring (25) in its interior. The outside diameter of the support tube is chosen such that the support tube can be inserted into the filter cartridge. This produces a sealing effect between the end disks (16) and the outer circumference of the support tube. The filter cartridge of the invention has the advantage of being cost-effective to produce and simple to assemble.

8 Claims, 2 Drawing Sheets

CYLINDRICAL FILTER CARTRIDGE WITH SUPPORT TUBE

BACKGROUND OF THE INVENTION

The present invention relates to a filter cartridge which comprises an annularly closed filter medium having axial end faces provided with end disks and which is disposed on a support tube, as well as to a filter in which such a filter cartridge is installed.

Filter cartridges of this type are known. They are used, for example, for filtering lubricating oil in an internal combustion engine. An example of such a filter cartridge is disclosed in WO 98/05 403. The cartridge has the geometry of a regular cylinder. The support tube is made in two parts, which are inserted from the two end faces of the cartridge into the interior formed by the filter paper and are snapped together. When the cartridge is installed in a filter housing, a seal is formed between the unfiltered and the filtered side by means of sealing rings, which are arranged on the support tube.

The two parts of the support tube are interlocked by means of a snap connection. This design requires, however, that the filter cartridge be produced in a first step and the support tube inserted in a second step. Furthermore, due to shoulders formed at the end of the two support tube halves, the support tube must always be made in two parts, since the filter cartridge must be mounted between the shoulders. The seal of the mounted cartridge on the support tube is then produced by the inherent elasticity of the end disks, which rest directly against the outer shell of the support tube. The end disks are preferably made of a nitrile rubber sheet material which is thermally cured to form the filter cartridge.

SUMMARY OF THE INVENTION

It is an object of the invention to provide a filter cartridge with an annularly closed filter medium and end disks at its end faces, which forms a simple unit with a support tube mounted in the interior of the cartridge.

Another object of the invention is to provide a filter cartridge and support tube assembly that can be produced cost-effectively.

A further object of the invention is to provide a new filter design.

These and other objects have been achieved in accordance with the present invention by providing a filter cartridge having an annularly closed filter medium having end faces provided with end disks to form a seal and which has a support tube which is provided with inlet openings and has end areas which are connected to the end disks so as to form a seal, wherein, in at least one of the end areas of the support tube, a sealing ring is arranged with at least one sealing surface directed radially toward the interior of the support tube, and wherein the support tube is constructed in one piece and has an outside diameter dimensioned such that the support tube can be inserted into the filter cartridge from one side.

In accordance with a further aspect of the invention, the objects are achieved by providing a filter cartridge having an annularly closed filter medium having end faces provided with end disks to form a seal and which has a support tube provided with inlet openings and having end areas connected to the end disks so as to form a seal, wherein, in at least one of the end areas of the support tube, a sealing ring is arranged with at least one sealing surface directed radially toward the interior of the support tube, and wherein the support tube is constructed in one piece and at least one end area of the support tube is firmly connected to the adjoining end disk of the filter cartridge.

In yet another aspect of the invention the objects are achieved by providing a filter comprising a housing having an inlet and an outlet for a fluid to be filtered, and a filter cartridge as described above installed in the housing such that fluid flowing from the inlet to the outlet passes through said filter cartridge.

The support tube is inserted into the filter cartridge according to the invention in such a way that its end areas are connected with the end disks on the end faces of the filter cartridge so as to form a seal. This seal may be produced, for instance, by making the outside diameter of the support tube slightly larger than the relaxed inside diameter of the end disks. The mounted support tube slightly expands the elastic end disks, which creates the sealing effect.

Furthermore, within the support tube, a sealing ring is mounted at least on one side, the sealing effect of which is deployed radially inwardly starting from the inside wall of the support tube. Of course, additional axial sealing effects of the sealing ring can be utilized.

The support tube of the invention is made as one piece. This simplifies mounting the support tube within the cartridge, since fewer parts need to be handled. It also saves material because no snap connection is required to fix the support tube within the cartridge. It also makes the assembly more reliable, since there is no need to ensure that the snap connection interlocks. To enable the one-piece support tube to be pushed into the cartridge, its outside diameter must be dimensioned appropriately. This means that at least an end area of the support tube must be dimensioned so that it fits through the opening in the end disk. In other words, the outside diameter of this end area must be smaller, equal to or slightly larger than the opening in the end disk, but excess diameter of the support tube must be below the elastic limit of the end disk so that the disk can stretch over the tube without tearing. The filter medium must have the shape of a closed annulus to form an interior space for the support tube. The filter medium may be a folded filter paper, a wound-up or folded nonwoven material or a porous material. The annular filter medium does not necessarily need to have the form of a regular cylinder. Other shapes, e.g. an irregular or an elliptical cross section, are also feasible. Such configurations may offer advantages with respect to the mounting dimensions of the filter.

An alternative embodiment of the invention also provides for a one-piece support tube having at least one of its end areas is molded into the adjacent end disk of the filter cartridge. It is of course advantageous to mold both end areas into the corresponding adjacent end disks. This provides an elegant solution to the sealing problem between the end disks and the support tube. In this design, the respective integrally molded end area must have a zone that intersects with the spatial extension of the end disk. This may be accomplished, for instance, in that the inside diameter of the finished end disk is smaller than the diameter of the end area of the support tube. This creates a stable unit between end disk and center tube. The previously mentioned sealing ring in the interior of the support tube provides the seal between the unfiltered and the filtered side. This is why the connection between end area and end disk does not need to be radially elastic.

Of course, other joining procedures between end area and end disk are feasible. The support tube may for instance be friction welded to a thermoplastic end disk. Another alternative is to glue the end disk to the support tube. In contrast to the above-described alternative of the invention, however, the bond between end disk and support tube then can only be detached by destroying the cartridge.

In another embodiment of the invention, the end areas of the support tube are formed by elastic tongues whose ends are molded into the elastic end disk. This makes it possible to eliminate the sealing ring at this end of the cartridge, since the bond between the end disk and the support tube is sufficiently elastic so that the end disk can be used directly to provide a seal between the unfiltered and filtered side of the filter.

In a further embodiment of the invention, the sealing ring is mounted within the interior of the support tube in such a way that it does not touch the end disk of the filter cartridge. This makes it possible to isolate the sealing tasks between support tube and housing and between support tube and end disk and achieves a more a reliable seal.

In accordance with a further embodiment of the invention, the sealing ring is also embedded in the support tube. The sealing ring may be made, for instance, of needled felt and may be placed into the mold prior to injection molding of the support tube. This creates a reliable bond between the support tube and the sealing ring. The sealing ring may also be made of an elastomer. Alternative fastening methods include gluing the sealing ring to the support tube and/or inserting the sealing ring into a corresponding seat on the support tube with an interference fit. The excess dimension should be such that it reliably secures the sealing ring inside the support tube.

If the end areas of the support tube are molded into, e.g. embedded in the end disk, the sealing ring, if provided with a suitable geometry, can also be held by a form-fit connection, which is formed by the inner rim of the end disk. When the filter cartridge is manufactured, the sealing ring can then be loosely inserted and fixed by molding the support tube into the end disk.

The end disks may advantageously be made from a thermosetting nitrile rubber foil or sheet material. The use of this material for end disks of filter elements has been field-proven. The foil is applied to the end faces of the filter medium and heated. This causes the end disks to expand and the end faces of the filter medium to be sealed. After the nitrile rubber has hardened, it has sufficient remaining elasticity to ensure the desired sealing effect within the inside diameter.

In accordance with another embodiment of the invention, the support tube has a closed area starting from an end area. This makes it possible to influence the filtration behavior of the filter cartridge. Due to the one-part construction of the support tube, the closed area can be extended a long distance toward the opposite end area, since no snap connection is necessary within the interior of the support tube.

To enhance the fixation of the sealing ring within the support tube, a shoulder may advantageously be provided in addition. This also gives the sealing ring a defined installation site.

A filter using the filter cartridge according to the invention is also included within the scope of the invention.

These and other features of preferred embodiments of the invention, in addition to being set forth in the claims, are also disclosed in the specification and/or the drawings, and the individual features each may be implemented in embodiments of the invention either individually or in the form of subcombinations of two or more features and can be applied to other fields of use and may constitute advantageous, separately protectable constructions for which protection is also claimed.

BRIEF DESCRIPTION OF THE DRAWINGS

The invention will be described in further detail hereinafter with reference to illustrative preferred embodiments shown in the accompanying drawings in which.

DETAILED DESCRIPTION OF PREFERRED EMBODIMENTS

Figure 1:
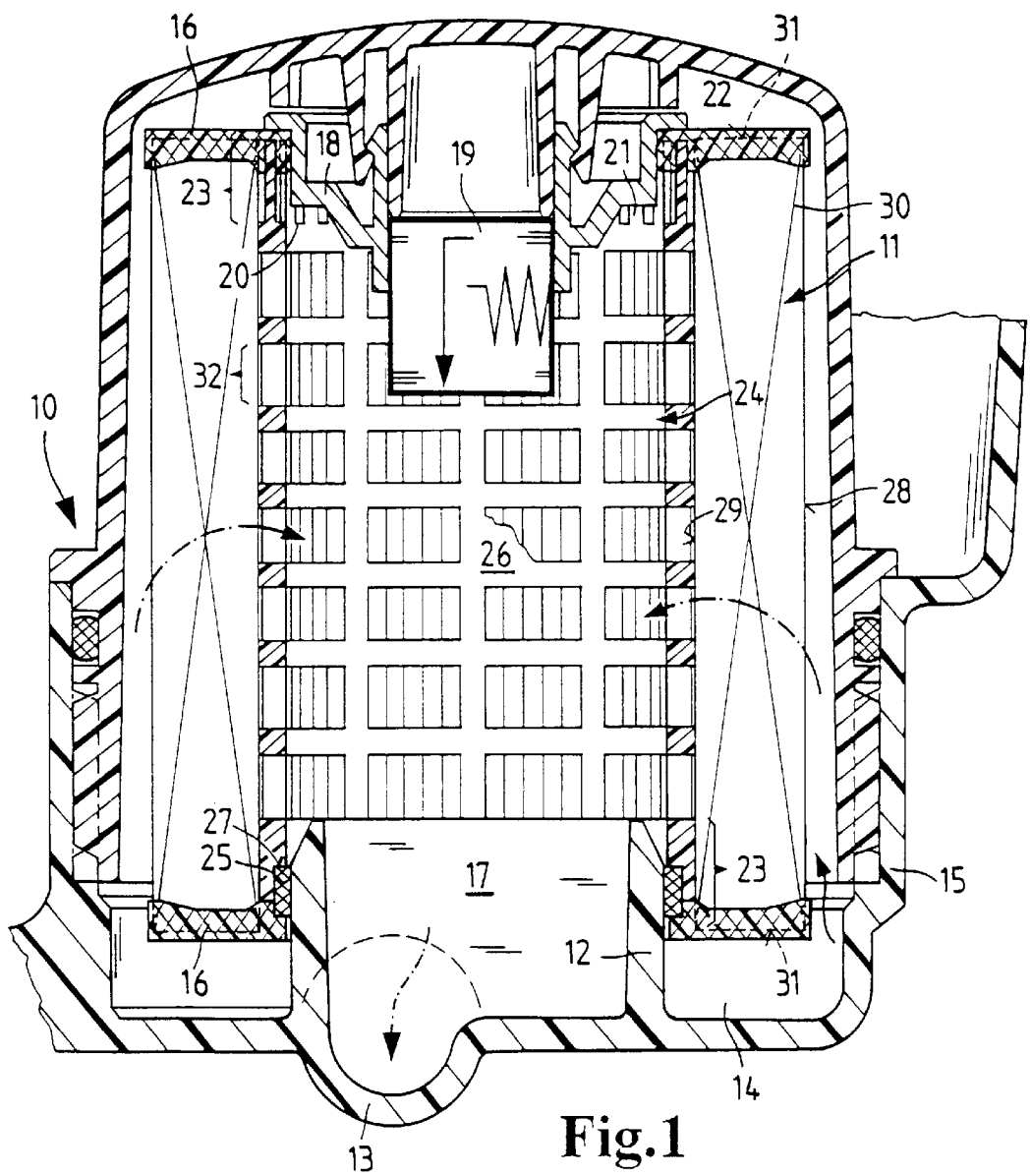
FIG. 1 is a central cross-sectional view of an oil filter for a motor vehicle in which a filter cartridge according to the invention is installed.

An illustrative oil filter according to the invention as shown in FIG. 1 comprises a housing 10 into which a filter cartridge 11 is inserted. One side of the filter cartridge is pushed onto a tube stub 12, which is connected to an outlet 13. An inlet 14 is integrated in a housing base 15. An end disk 16 of filter cartridge 11, which contacts tube stub 12, forms a passage 17 to outlet 13. A valve support 18 with a bypass valve 19 (illustrated schematically) is inserted into the other end disk 16. When the valve support 18 is inserted into the end disk 16, the disk is slightly stretched, which forms a seal between the two components. The requisite elasticity of the center tube is obtained through slots 20, which separate elastic tongues 21 from one another. The ends 22 of the tongues are embedded in end disk 16.

The tongues are accommodated in an end area 23 of a support tube 24. The opposite end area 23 of the support tube has practically no elasticity in radial direction. It also is embedded in end disk 16, with the result, however, that the end disk is no longer elastically deformable in radial direction. A sealing ring 25 is therefore arranged in the interior 26 of the support tube. Sealing ring 25 rests against a shoulder 27 and is fixed by end disk 16. The sealing ring 25 produces a seal in relation to tube stub 12 and thus between an unfiltered side 28 and a filtered side 29 of the filter.

The filter cartridge 11 comprises a star folded filter paper 30 whose end faces 31 are embedded in end disks 16. The oil flows from inlet 14 through the filter paper and inlet openings 32 in the support tube into the interior 26 of the support tube adjacent the filtered side 29 of the filter and then exits the filter through outlet 13.

Figure 2:
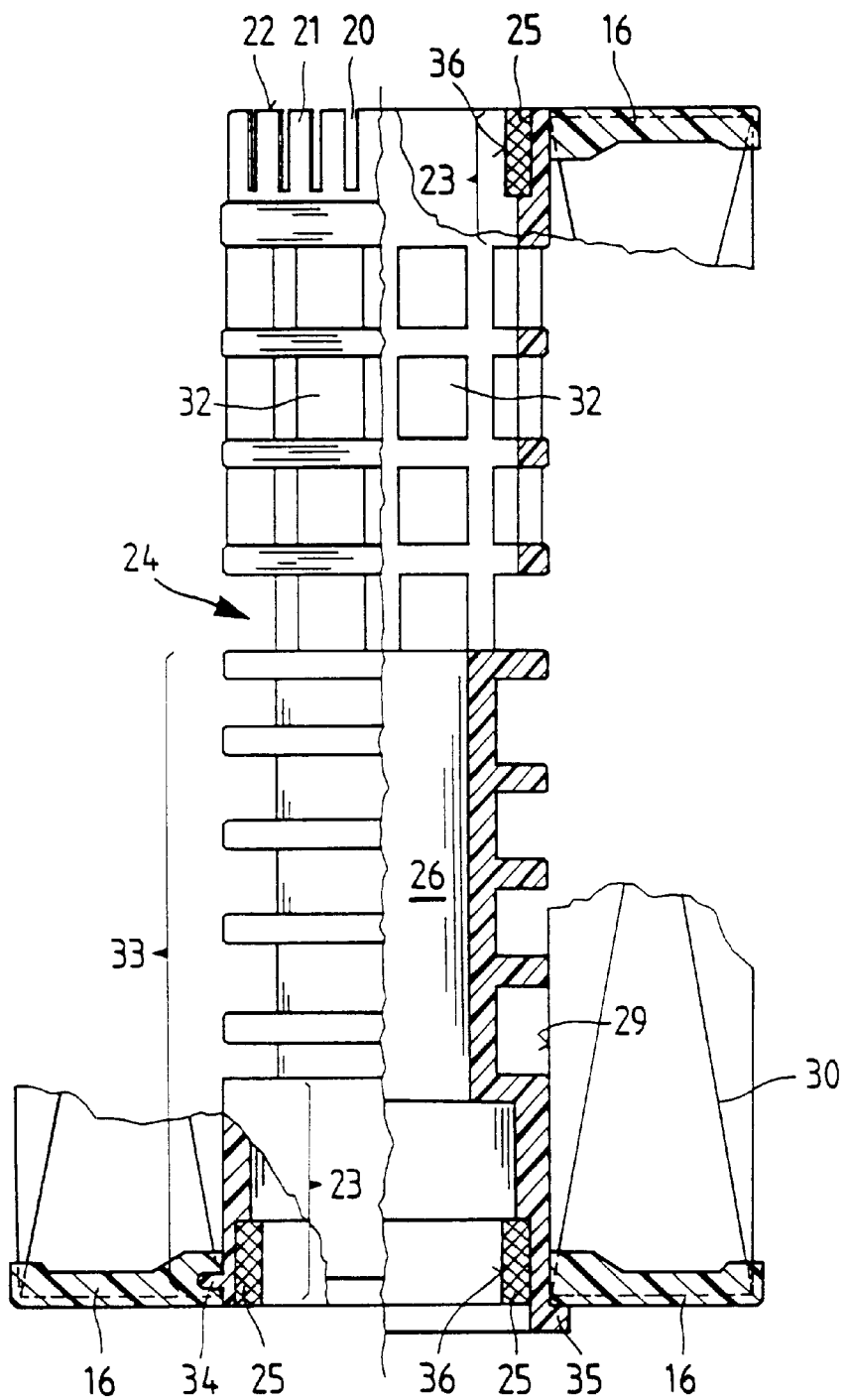
FIG. 2 is a partially cut away detail view of a center tube and the end disks of the associated filter cartridge, with different versions being depicted on the right and left sides of the figure.

FIG. 2 depicts the support tube with a portion of the filter cartridge. The left side of the support tube shows a version with the above-described tongues 21 in the upper area. For clarity of illustration, this portion is depicted without an end disk. In the lower portion of the left version of the support tube, there is a closed area 33, which largely separates the filtered side 29 of the filter from the interior 26 of the support tube. In the upper area of the support tube, inlet openings 32 are provided to ensure a connection between the filtered side 29 and the interior 26. Embedded in the lower end area 23 of the support tube is a sealing ring 25, which is completely separated from the end disk 16. The connection between end disk 16 and end area 23 of the support tube is improved by an annular shoulder 34, which is enclosed by the end disk.

The right portion of the support tube 24 represents a version, which has a sealing ring 25 in both end areas 23. This support tube is inserted into the filtered side 29 of the filter cartridge, so that a seal is formed between end disks 16 and support tube 24 by means of a radial expansion of the end disks. In this case, too, sealing rings 25 are completely separated from end disks 16 by support tube 24. The support tube has an axial stop 35 on one side and therefore must be inserted from below as indicated by an arrow in the drawing. When the filter cartridge is installed within the housing, sealing surfaces 36 of sealing ring 25 are compressed at the installation site, so that a seal is formed between the unfiltered and the filtered side of the filter.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations falling within the scope of the appended claims and equivalents thereof.

What is claimed is:

1. A filter cartridge having an annularly closed filter medium having end faces provided with end disks to form a seal and which has a support tube provided with inlet openings and having end areas connected to the end disks so as to form a seal, wherein the seal is formed with a radial expansion of the end disks, wherein, in at least one of the end areas of the support tube, a sealing ring is arranged with at least one sealing surface directed radially toward the interior of the support tube, wherein the support tube is constructed as one piece and at least one end area of the support tube is firmly connected to the adjoining end disk of the filter cartridge, wherein the sealing ring in the end area of the support tube does not touch the end disk which contacts this same end area; wherein said one end area of the support tube is provided with axially extending tongues which are separated by slots and are at least partially molded into the adjoining end disk, and wherein the adjoining end disk is made of an elastic material.

2. A filter cartridge according to claim 1, wherein said filter medium is a pleated filter paper.

3. A filter cartridge according to claim 1, wherein the support tube is connected to the adjoining end disk of the filter cartridge by molding the support tube integrally into the end disk.

4. A filter cartridge as claimed in claim 1, wherein the sealing ring is embedded in the support tube.

5. A filter cartridge as claimed in claim 1, wherein the end disks are made of a thermosetting nitrile rubber sheet material.

6. A filter cartridge as claimed in claim 1, wherein the support tube has a closed area toward one end area, and the inlet openings are arranged toward the other end area.

7. A filter cartridge as claimed in claim 1, wherein the sealing ring is axially supported by a shoulder provided in the interior of the support tube.

8. A filter comprising a housing having an inlet and an outlet for a fluid to be filtered, and a filter cartridge according to claim 1, installed in said housing such that fluid flowing from said inlet to said outlet passes through said filter cartridge.

* * * * *